US012190212B2

(12) United States Patent
Karp et al.

(10) Patent No.: US 12,190,212 B2
(45) Date of Patent: Jan. 7, 2025

(54) MANAGING MULTIFACETED, IMPLICIT GOALS THROUGH DIALOGUE

(71) Applicant: Capital One Services, LLC, McLean, VA (US)

(72) Inventors: Scott Karp, McLean, VA (US); Erik Mueller, Chevy Chase, MD (US); Zachary Kulis, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 268 days.

(21) Appl. No.: 18/047,154

(22) Filed: Oct. 17, 2022

(65) Prior Publication Data

US 2023/0062915 A1 Mar. 2, 2023

Related U.S. Application Data

(63) Continuation of application No. 16/887,283, filed on May 29, 2020, now Pat. No. 11,475,366, which is a
(Continued)

(51) Int. Cl.
*G06N 20/00* (2019.01)
*G06F 40/205* (2020.01)
(Continued)

(52) U.S. Cl.
CPC ........... *G06N 20/00* (2019.01); *G06F 40/205* (2020.01); *G06F 40/30* (2020.01); *G06F 40/35* (2020.01);
(Continued)

(58) Field of Classification Search
USPC .................................. 706/1–934; 704/1–504
See application file for complete search history.

(56) References Cited

U.S. PATENT DOCUMENTS 8,346,563 B1  1/2013 Hjelm et al.
10,095,688 B1 * 10/2018 Schilling ................. H04L 51/06
(Continued)

OTHER PUBLICATIONS

Singh, et al., "KNADIA: Enterprise KNowledge Assisted DIAlogue Systems using Deep Learning," 2018 IEEE 34th International Conference on Data Engineering, Apr. 16-19, 2018, 12 pages.
(Continued)

*Primary Examiner* — Marcus T Riley
(74) *Attorney, Agent, or Firm* — DLA PIPER LLP (US)

(57) ABSTRACT

System and method of generating an executable action item in response to natural language dialogue are disclosed herein. A computing system receives a dialogue message from a remote client device of a customer associated with an organization, the dialogue message comprising an utterance indicative of an implied goal. A natural language processor of the computing system parses the dialogue message to identify one or more components contained in the utterance. The planning module of the computing system identifies the implied goal. The computing system generates a plan within a defined solution space. The computing system generates a verification message to the user to confirm the plan. The computing system transmits the verification message to the remote client device of the customer. The computing system updates an event queue with instructions to execute the action item according to the generated plan upon receiving a confirmation message from the remote client device.

20 Claims, 8 Drawing Sheets

Related U.S. Application Data continuation of application No. 16/420,290, filed on May 23, 2019, now Pat. No. 10,671,941.

(51) Int. Cl.
*G06F 40/30* (2020.01)
*G06F 40/35* (2020.01)
*G06Q 30/016* (2023.01)
*G10L 15/18* (2013.01)
*G10L 15/22* (2006.01)
*G10L 15/30* (2013.01)
*G10L 25/63* (2013.01)

(52) U.S. Cl.
CPC ........ *G06Q 30/016* (2013.01); *G10L 15/1815* (2013.01); *G10L 15/22* (2013.01); *G10L 2015/223* (2013.01); *G10L 15/30* (2013.01); *G10L 25/63* (2013.01)

(56) References Cited

U.S. PATENT DOCUMENTS

| | | | | |
|---|---|---|---|---|
| 10,200,314 | B1 * | 2/2019 | Karp | ............ H04L 67/306 |
| 10,255,274 | B1 * | 4/2019 | Schilling | ............ H04L 51/06 |
| 10,332,505 | B2 * | 6/2019 | Zoller | ............ G10L 13/027 |
| 10,671,941 | B1 * | 6/2020 | Karp | ............ G06F 40/30 |
| 10,685,358 | B2 * | 6/2020 | Coman | ............ G06Q 10/063 |
| 10,832,255 | B2 * | 11/2020 | Coman | ............ G10L 17/00 |
| 10,846,484 | B2 * | 11/2020 | Schilling | ............ G06F 11/3438 |
| 2009/0228264 | A1 | 9/2009 | Williams et al. | |
| 2013/0179440 | A1 * | 7/2013 | Gordon | ............ G06Q 10/06 |
| | | | | 707/E17.014 |
| 2014/0006067 | A1 | 1/2014 | Rothley et al. | |
| 2014/0365222 | A1 | 12/2014 | Weider et al. | |
| 2016/0098992 | A1 | 4/2016 | Renard et al. | |
| 2018/0261203 | A1 * | 9/2018 | Zoller | ............ H04L 51/02 |
| 2018/0365026 | A1 | 12/2018 | Jernigan et al. | |
| 2019/0035386 | A1 | 1/2019 | Leeb et al. | |
| 2019/0139538 | A1 | 5/2019 | Gelfenbeyn et al. | |
| 2019/0156838 | A1 | 5/2019 | Kannan et al. | |
| 2019/0214024 | A1 | 7/2019 | Gruber et al. | |
| 2019/0236469 | A1 | 8/2019 | Canim et al. | |
| 2019/0267001 | A1 | 8/2019 | Byun et al. | |
| 2019/0272547 | A1 * | 9/2019 | Coman | ............ G06N 5/046 |
| 2019/0306093 | A1 * | 10/2019 | Schilling | ............ G06F 16/2455 |
| 2020/0320542 | A1 * | 10/2020 | Coman | ............ G06Q 30/016 |
| 2020/0372411 | A1 * | 11/2020 | Karp | ............ G10L 15/1822 |
| 2023/0062915 | A1 * | 3/2023 | Karp | ............ G06F 40/30 |

OTHER PUBLICATIONS

Shum, et al., "From Eliza to Xiaolce: challenges and opportunities with social chatbots," Frontier of Information Technology & Electronic Engineering, 2018, 17 pages.

* cited by examiner

MANAGING MULTIFACETED, IMPLICIT GOALS THROUGH DIALOGUE

CROSS-REFERENCE TO RELATED APPLICATION INFORMATION

This is a continuation of U.S. patent application Ser. No. 16/887,283, filed May 29, 2020, which is a continuation of U.S. patent application Ser. No. 16/420,290, filed May 23, 2019, now U.S. Pat. No. 10,671,941, issued Jun. 2, 2020, which are incorporated by reference in their entireties.

FIELD OF THE DISCLOSURE

The present disclosure generally relates to improvements in computer-implemented intelligent agents for translating natural language dialogue utterances containing one or more unexpected responses or goals to executable action items according to a generated plan.

BACKGROUND

Automated systems for interacting with customers by generating automatic, written, auditory, or video responses via web and mobile device application channels are useful ways to provide customers with requested information and perform routine account actions in an expedited, extended hours fashion, without the need to have a large workforce of customer service agents.

Intelligent agents are capable of handling predefined commands that are expressly stated by a customer. Existing intelligent agents are typically trained in a narrow domain for recognizing such predefined, expressly stated commands. As such, existing intelligent agents are limited in their capabilities for handling complex user utterances that are not directly responsive to a previous dialogue message, for understanding a stray direction taken in the dialogue, for recognizing implicit goals expressed in the dialogue, and the like.

In some domains, such user interaction with an intelligent agent is commonplace. In a particular example, intelligent agents implemented in the financial domain may invoke emotional customer utterances that lack an explicit request or instruction such that existing intelligent agents are simply unable to effectively handle. As such, there is a need for improved intelligent agents that are able to understand implicit goals contained in a customer utterance, as well as recognize an emotional sentiment of the customer, and identify an effective response or executable action to assist the customer.

SUMMARY

Embodiments disclosed herein generally relate to a computer-implemented method of generating an executable action item in response to natural language dialogue. In one embodiment, a computer-implemented method of generating an executable action item in response to natural language dialogue is disclosed herein. A computing system receives a dialogue message from a remote client device of a customer associated with an organization, the dialogue message comprising an utterance indicative of an implied goal. A natural language processor of the computing system parses the dialogue message to identify one or more components contained in the utterance. The planning module of the computing system identifies the implied goal. The computing system generates a plan within a defined solution space. The plan includes an action item based on the identified implied goal. The computing system generates a verification message to the user to confirm the plan. The computing system transmits the verification message to the remote client device of the customer. The computing system updates an event queue with instructions to execute the action item according to the generated plan upon receiving a confirmation message from the remote client device.

In some embodiments, generating the plan comprising the action item based on the identified goal includes the computing system cross-referencing the plan against one or more policies set forth by the organization to ensure that the plan does not violate any of the one or more policies.

In some embodiments, generating the plan comprising the action item based on the identified goal includes the computing system querying a database to identify one or more pre-existing plans associated with the customer. The computing system cross-references the generated plan against the one or more pre-existing plans to ensure that none of the one or more pre-existing plans are violated by the generated plan.

In some embodiments, the goal of the dialogue message includes an unclarified goal, which is not expressly stated.

In some embodiments, the computing system further generates a reply message that includes one or more prompts that aid in further identifying the unclarified goal. The computing system further transmits the reply message to the remote client device of the customer.

In some embodiments, the computing system further receives a further dialogue message from the remote client device clarifying the unclarified goal. The computing system further modifies the plan upon receiving the further dialogue message that clarifies the unclarified goal.

In some embodiments, receiving the dialogue message from the remote client device of the customer associated with the organization includes the computing system receiving the dialogue message via a communication channel that includes a voice-based channel, a text-message based channel, and a web-based channel.

In some embodiments, the dialogue message includes a current sentiment of the customer.

In some embodiments, parsing the dialogue message to identify the goal contained therein includes the computing system parsing the dialogue message to identify the current sentiment of the customer.

In some embodiments, generating a verification message to the user to confirm the plan includes the computing system generating the verification message to convey an empathetic response to the user based on the identified current sentiment of the customer.

In another embodiment, a method of translating natural language dialogue to executable action items is disclosed herein. A computing system receives a first dialogue message from a remote client device of a customer associated with an organization. The computing system parses the dialogue message to identify one or more implicit goals contained therein. The computing system generates a reply message to the dialogue message. The reply message includes one or more prompts to further clarify the one or more implicit goals. The computing system transmits the reply message to the remote client device. The computing system receives a second dialogue message from the remote client device of the customer. The further message includes one or more clarified goals based on the one or more prompts. The computing system generates a plan comprising a sequence of action items based on the one or more clarified goals. The computing system generates a verification message to the user to verify the plan. The computing system transmits the verification message to the remote client device of the customer. The computing system, upon receiving a confirmation message from the remote client device, updates an event queue with instructions to execute the sequence of action items according to the generated plan.

In some embodiments, generating the plan that includes the sequence of action items based on the one or more clarified goals includes the computing system cross-referencing the plan against one or more policies set forth by the organization to ensure that the plan does not violate any of the one or more policies.

In some embodiments, generating the plan that includes the sequence of action items based on the identified clarified goal includes the computing system querying a database to identify one or more pre-existing plans associated with the customer. The computing system cross-references the generated plan against the one or more pre-existing plans to ensure that none of the one or more pre-existing plans are violated by the generated plan.

In some embodiments, the dialogue message further includes a sentiment of the customer.

In some embodiments, generating the verification message to the user to verify the plan, the computing system embeds in the verification message an empathetic response to the customer's current sentiment.

In some embodiment, the first dialogue message is received via first communication channel and the second dialogue message is received via a second dialogue channel.

In some embodiments, the first communication channel is selected from a voice-based channel, a text-message based channel, and a web-based channel.

In some embodiments, the first communication channel and the second communication channel are the same.

In another embodiment, a system is disclosed herein. The system includes a processor and a memory. The memory has programming instructions stored thereon, which, when executed by the processor, causes operations to be performed. The operations include receiving a dialogue message from a remote client device of a customer associated with an organization. The dialogue message includes at least a goal. The operations include parsing the dialogue message to identify the goal contained therein. The operations include generating a plan within a defined solution space. The plan includes an action item based on the identified goal. The operations include generating a verification message to the user to confirm the plan. The operations include transmitting the verification message to the remote client device of the customer. The operations include updating an event queue with instructions to execute the action item according to the generated plan upon receiving a confirmation message from the remote client device.

In some embodiments, the operation of generating the plan comprising the action item based on the identified goal includes cross-referencing the plan against one or more policies set forth by the organization to ensure that the plan does not violate any of the one or more policies.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
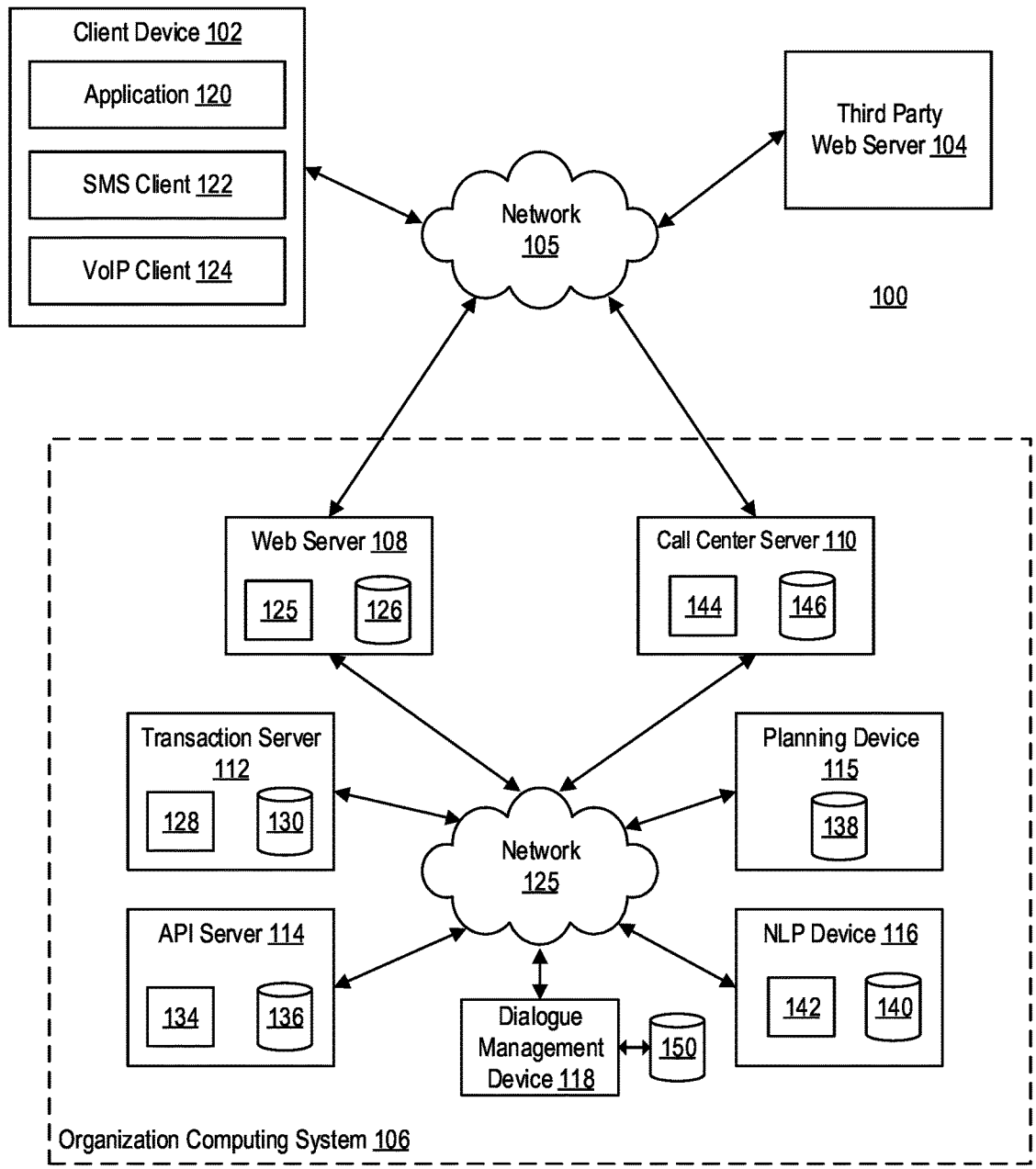
FIG. 1 is a block diagram illustrating a computing environment, according to one embodiment.

The present disclosure generally relates to improvements in computer-implemented intelligent agents for translating natural language dialogue utterances containing one or more unexpected goals to executable action items according to a generated plan.

One or more techniques disclosed herein relate to identifying one or more intents contained in a customer's request. Intelligent agents are capable of handling predefined commands that are expressly stated by a customer. Existing intelligent agents are typically trained in a narrow domain for recognizing such predefined, expressly stated commands. As such, existing intelligent agents are limited in their capabilities for handling complex user utterances that are not directly responsive to a previous dialogue message, for understanding a stray direction taken in the dialogue, for recognizing implicit goals expressed in the dialogue, and the like.

In some domains, such user interaction with an intelligent agent is commonplace. In a particular example, intelligent agents implemented in the financial domain may invoke emotional customer utterances that lack an explicit request or instruction such that existing intelligent agents are simply unable to effectively handle. As such, there is a need for improved intelligent agents that are able to understand implicit goals contained in a customer utterance, as well as recognize an emotional sentiment of the customer, and identify an effective response or executable action to assist the customer.

The one or more techniques disclosed herein address the limitation of conventional systems by providing a computing environment which is able to decompose and understand a customer's message. The system is then able to more effectively identify one or more intents contained therein by not only identifying goals that are expressly stated, but also those goals that are implied (e.g., implied goals) based on customer context. In some embodiments, the received messages may be discrete, unrelated, utterances received from the user. In some embodiments, the received messages may form a larger dialogue established between the user and an organization that may provide an intelligent agent to assist its users/customers. As such, the one or more techniques disclosed herein are able to not only understand and respond to simple user requests, but are also able to understand complex problems uttered by the user over the course of several messages.

In some embodiments, the one or more techniques described herein are able to identify a sentiment of the user. For example, the presently disclosed system may analyze the received message to identify language (e.g., word choice, phrases, voice inflection, and the like) that may reflect a current emotion of the user. By identifying the current sentiment of the user, the presently disclosed system may personalize responses to the user to empathize with the user's current sentiment.

In a specific example, the system may receive a request "I'm sorry for being late on my payment, I just got out of the hospital. Can I pls get an extension until Sunday?" The user's request may be responsive to a notification from the system, such as "As a reminder, a payment was due on your account yesterday, would you like to pay now?" The system may identify one or more intents contained therein: a payment extension until Sunday (express goal) and a request to forgive any financial penalty due to the hardship (implied/inherent goal). The system may identify a sentiment of the user: for example, the user may be distraught. Based on the parsed message, the system may be able to generate a plan to address the needs of the user, while also empathizing with the user's expressed situation.

The plan generated by the presently disclosed system may differ from generic plans generated by conventional intelligent agents. For example, conventional intelligent agents may pigeonhole each message received from the user into one or more pre-defined category. As such, conventional intelligent agents are primarily concerned with overt, express goals (e.g., payment request), while simply being incapable of detecting implied goals (e.g., extension request without penalty) and a current sentiment of the user (e.g., distraught from the hospital stay). Due to the sensitive nature of financial matters, existing systems frequently receive complex, emotional, utterances from the user, and currently do not have a recourse to sufficiently understand and respond to these utterances.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

FIG. 1 is a block diagram illustrating a computing environment 100, according to one embodiment. Computing environment 100 may include a client device 102, a third party web server 104, and an organization computing system 106 communicating via network 105. Client device 102 may be operated by a user (or customer). For example, client device 102 may be a mobile device, a tablet, a desktop computer, or any computing system having the capabilities described herein. Client device 102 may belong to or be provided by a customer, or may be borrowed, rented, or shared. Customers may include individuals such as, for example, subscribers, clients, prospective clients, or customers of an entity associated with organization computing system 106, such as individuals who have obtained, will obtain, or may obtain a product, service, or consultation from an entity associated with organization computing system 106.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receiving information between the components of environment 100.

Third party web server 104 may include a computer system associated with an entity other than the entity associated with organization computing system 106 and customers that perform one or more functions associated with the organization computing system 106. For example, third party web server 104 may be directed to a server hosting an electronic mail (e-mail) web application or website.

Client device 102 may include at least an application 120, a short message service (SMS) client 122, and a voice over internet protocol (VoIP) client 124. Application 120 may be representative of a web browser that allows access to a website or a stand-alone application. User of client device 102 may access application 120 to access functionality of third party web server 104. User operating client device 102 may communicate over network 105 to request a webpage, for example, from third party web server 104. For example, client device 102 may be configured to execute application 120 to access one or more functionalities managed by third party web server 104. The content that is displayed to user of client device 102 may be transmitted from third party web server 104 to client device 102, and subsequently processed by application 120 for display through a graphical user interface (GUI) of client device 102. SMS client 122 may be configured to provide text messaging functionality to client device 102. For example, user may access SMS client 122 to communicate with organization computing system 106 or other client devices over network 105 via text message. VoIP client 124 may be configured to provide voice communications over IP networks (e.g., network 105).

Organization computing system 106 may be associated with or controlled by an entity, such as a business, corporation, individual partnership, or any other entity that provides one or more of goods, services, and consultations to individuals such as customers.

Organization computing system 106 may include one or more servers and computer systems for performing one or more functions associated with products and/or services provided by the organization associated with organization computing system 106. Organization computing system 106 may include a web server 108, a call center server 110, a transaction server 112, an application programming interface (API) server 114, a planning device 115, a natural language processing (NLP) device 116, and a dialogue management device 118 communicating via local network 125.

Web server 108 may include a computer system configured to generate and provide one or more websites accessible to users or customers, as well as any other individuals involved in organization computer system's 106 normal operations. For example, web server 108 may include a computer system configured to receive communications from a client device 102 via a mobile application, a chat program, an instant messaging program, a voice-to-text program, an SMS message, email, or any other type or format of written or electronic communication. In particular, web server 108 may include a computer system configured to receive communications from a client device 102 via, for example, application 120, SMS client 122, or VoIP client 124, executing on client device 102.

Web server 108 may have one or more processors 123 and one or more web server databases 126, which may be any suitable repository of website data. Information stored in web server 108 may be accessed (e.g., retrieved, updated, and/or added to) via local network 125 by one or more components of organization computing system 106. In some embodiments, processor 125 may be used to implement an automated natural language dialogue system that may interact with a customer via different types of communication channels, such as a website, mobile application, instant messaging application, SMS message, email, or any other type of electronic communication. For example, while one or more components of organization computing system 106 may receive a communication from a user via, for example, application 120, SMS client 122, or VoIP client 124, a respective component of organization computing system 106 (e.g., planning device 115) may identify parse the communication to identify one or more goals (both implicit and explicit) contained therein and generate a plan to address those goals.

Call center server 110 may include a computer system configured to receive, process, and route telephone calls and other electronic communications between a customer operation client device 102 and dialogue management device 118. Call center server 110 may include one or more processors 144 and one or more call center databases 146, which may be any suitable repository of call center data. Information stored in call center server 110 may be accessed (e.g., retrieved, updated, and/or added to) via local network 125 by one or more devices (e.g., dialogue management device 118) of organization computing system 106. In some embodiments, call center server processor 144 may be used to implement an interactive voice response (IVR) system that interacts with the customer over the phone.

Transaction server 112 may include a computer system configured to process one or more transactions involving accounts associated with customers, or a request received from customers. In some embodiments, transactions may include, for example, a product/service purchase, a product/service return, financial transfer, financial deposit, financial withdrawal, financial credit, financial debit, dispute request, warranty coverage request, account balance request, and any other type of transaction associated with the products and/or services that an entity associated with organization computing system 106 provides to individuals, such as customers. Transaction server 112 may include one or more processors 128 and one or more transaction server databases 130, which may be any suitable repository of transaction data. Information stored in transaction server 112 may be accessed (e.g., retrieved, updated, added) via local network 125 by one or more devices of organization computing system 106.

Further, although transaction server 112 is discussed in conjunction with financial institutions and financial transactions, those skilled in the art may readily understand that transaction server 112 may be used in conjunction with different organizations, such as, but not limited to, medical, business, management, and other conceivable organization.

Natural language processing (NLP) device 116 may include a computer system configured to receive and process incoming dialogue messages and determine a meaning of the incoming dialogue message. NLP device 116 may be configured to receive and execute a command that includes an incoming dialogue message where the command instructs NLP device 116 to determine the meaning of the incoming dialogue message. NLP device 116 may be configured to continuously monitor or intermittently listen for and receive commands from a command queue to determine if there are any new commands directed to NLP device 116. Upon receiving and processing an incoming dialogue message, NLP device 116 may output the meaning of an incoming dialogue message in a format that other devices can process.

In one example, the received dialogue message may be the result of a user providing additional information to organization computing system 106 as a result of being prompted by organization computing system. In this example, organization computing system 106 may receive a text message from the user. For example, organization computing system 106 may receive a dialogue message in response to a clarification question submitted by organization computing device. Dialogue management system 118 may place the dialogue message in a command queue, accessible by NLP device 116. NLP device 116 may identify that a new command is directed to NLP device 116, and may generate a response to the user's dialogue message. For example, NLP device 116 may generate a message to be transmitted to the user, to invite the user to supply further information.

NLP device 116 may include one or more processors 142 and one or more NLP databases 140. Information stored in NLP device 116 may be accessed via local network 125 by one or more components of organization computing system 106. In some embodiments, NLP processor 140 may be used to implement an NLP system that may determine the meaning behind a string of text and convert it to a form that can be understood by other devices.

NLP device 116 may work in conjunction with planning device 115. Planning device 115 may include one or more computer systems configured to develop a plan based on a message received from client device 102. For example, planning device 115 may identify one or more goals contained in a received message that has been parsed and understood by NLP device 116. The one or more goals contained therein may include both explicit goals and implicit goals. Based on the goal, planning device 115 may generate a plan that includes an action item or a sequence of action items. The action item may be executed at some point following the received message, based on one or more parameters of the generated plan.

For example, a user of client device 102 may transmit to organization computing system 106 a message including the message "I'm sorry for being late on my payment, I just got out of the hospital. Can I pls get an extension until Sunday?" NLP device 116 may parse the received message to understand one or more components of the received message. One or more components of the message may include one or more multiple intents and/or one or more contexts of the respective message. From the one or more components of the message, planning device 115 may identify intents contained in the message and categorize the intents as one or more of a sentiment, express goal (e.g., requesting an extension until Sunday), an implied goal (e.g., an extension without penalty due to the hardship) or a unresponsive narrative. In some embodiments, based on these intents, planning device 115 may generate a plan (e.g., granting the extension, pending approval) that includes an executable action item (requesting approval from the organization). Planning device 115 may transmit the plan and/or executable action item to user of client device 102 for review and approval. Upon receiving a confirmation from the user of client device 102 that the plan is correct, planning device 115 may update an event queue with instructions to execute the action item (i.e., submitting a request for an extension and forgiveness of an extension penalty) according to the generated plan (e.g., granting the user more time to make a payment, without additional fees).

In some embodiments, planning device 115 may need further information from a user of client device 102 to more accurately identify intents of the user. For example, planning device 115 may prompt organization computing system 104 to interact with the user to obtain additional information about the message received from client device 102. For example, the following conversation may occur between the user and organization computing system 104:

Organization Computing System 104: Hi User, as a reminder your payment is past due.

Client Device 102: Sorry I'm late, I'm expecting to get paid on Friday and hopefully it will be enough for me to make a payment.

Organization Computing System 104: I understand managing your finances can be difficult. How about I check in again on Friday?

Client Device 102: thanks!

Organization Computing System 104: In the meantime, I can help connect you to a money coach in one of our cafes to help you manage your money. Would you like more information?

Dialogue management device 118 may include one or more computer systems configured to receive and/or compile information from a plurality of sources, such as planning device 115, web server 108, call center server 110, and transaction server 112, correlate received and/or compiled information, analyze the compiled information, arrange the compiled data, generate derived information based on the compiled information, and store the compiled and derived information in a database (e.g., database 150). According to some embodiments, database 150 may be a database associated with the organization of organization computing system 106 and/or its related entity that stores a variety of information relating to customers, transactions, and business operations. Database 150 may also serve as a back-up storage device and may contain data and information that is also stored on, for example, databases 126, 130, 136, 138, 140, and 146. Although databases 126, 130, 136, 138, 140, and 146 are illustrated as separate databases, those skilled in the art may readily understand that two or more of databases 126, 130, 136, 138, 140, and 146 may be combined into a single accessible data source on premises or in the cloud.

Database 150 may be accessed by dialogue management device 118. For example, database 150 may be used to store records of every interaction, communication, and/or transaction a particular customer has with organization computing system 106 and/or its related entities. Such recording aids in creating an ever-evolving customer context that allows dialogue management device 118 to provide customized and adaptive dialogue when interacting with the customer. The customer context may include unique information associated with a particular user. For example, customer context may include a pattern of user behavior in contacting a customer service line, a pattern of user behavior while navigating a web application associated with the organization, previous incidents opened up with customer service representatives, and the like. Customer context may also include personal information associated with the user. For example, such personal information may include major events in the customer's life (e.g., marriage, child birth, buying of a house, etc.), travel information associated with the user (e.g., based on the location of recent transactions), and the like.

API server 114 may include a computer system configured to execute one or more APIs that provide various functionalities related to the operations of organization computing system 106. In some embodiments, API server 114 may include an API adapter that allows API server 114 to interface with and utilize enterprise APIs maintained by organization computing system 106 and/or an associated entity that may be housed on other systems or devices. In some embodiments, APIs may provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. API server 114 may include one or more processors 134 and one or more API databases 136, which may be any suitable repository of API information. Information stored in API server 114 may be accessed via local network 125 by one or more components of organization computing system 106. In some embodiments, API processor 134 may be configured to access, modify, and retrieve customer account information.

In one example, dialogue management device 118 may receive a request as a result of a user clicking a pre-defined hyperlink embedded in a received email. For example, API server 114 may generate an API that links web server 108 to the functionality of dialogue management system 118. In this example, the user clicking the pre-defined hyperlink embedded in the received email may signal to web server 108 to translate information provided in the pre-defined hyperlink to an API call to be transmitted to dialogue management device 118. After dialogue management device 118 receives an API call, via the generated API, from web server 108, dialogue management device 118 may parse the API call to extract a customer identifier and a request identifier from the API call, and generate a command to place in a command queue, as described in detail below. Organization computing system 106 may establish an interactive chat session with client device 102 via text message.

Local network 125 may comprise any type of computer networking arrangement used to exchange data in a localized area, such as Wi-Fi, Bluetooth™, Ethernet, and other suitable network connections that enable components of organization computing system 106 to interact with one another and to connect to network 125 for interacting with components in computing environment 100. In some embodiments, local network 125 may include an interface for communicating with or linking to network 105. In some embodiments, components of organization computing system 100 may communicate via network 105, without a separate local network 125.

Figure 2:
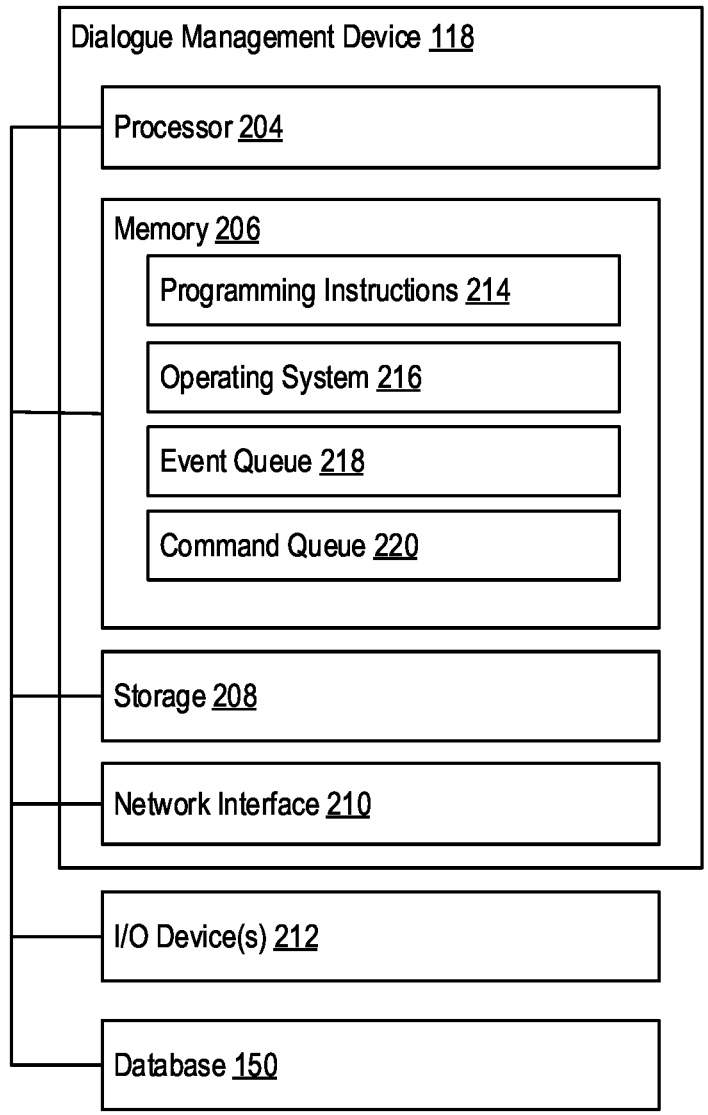
FIG. 2 is a block diagram illustrating a component of the computing environment of FIG. 1, according to one embodiment.

FIG. 2 is a block diagram illustrating dialogue management device 118, according to one embodiment. Dialogue management device 118 may include a processor 204, a memory 206, a storage 208, and a network interface 210. In some embodiments, dialogue management device 118 may be coupled to one or more I/O device(s) 212.

In some embodiments, dialogue management device 118 may be in communication with database 150. Database 150 may store information to enable dialogue management device 118 to perform one or more of the processes and functionalities associated with the disclosed embodiments. Database 150 may include stored data relating to a customer profile and customer accounts, such as, for example, customer identification information (e.g., name, age, sex, birthday, address, VIP status, key customer status, preferences, preferred language, vehicle(s) owned, greeting name, channel, talking points, bank accounts, mortgage loan accounts, car loan accounts, account numbers, authorized users associated with one or more accounts, account balances, account payment information, and any other information that may be related to a user's account). Database 150 may store customer interaction data that includes records of previous customer service interactions with a customer via a website, SMS message, a chat program, a mobile application, an IVR system, or notations taken after speaking with a customer service agent. Database 150 may also include information about business transactions between organization computing system (or its related entities) and a customer that may be obtained from transaction server 112. Database 150 may also include customer feedback data, such as an indication of whether an automated interaction with a customer was successful, online surveys filled out by a customer, surveys answered by a customer following previous interaction to the company, digital feedback provided through websites or mobile applications associated with the organization, and the like.

Processor 204 may include one or more of a microprocessor, microcontroller, digital processor, co-processor, or the like, or combinations thereof executing stored instructions and operating upon stored data. Processor 204 is included to be representative of a single processor, multiple processors, a single processor having multiple processing cores, and the like.

Network interface 210 may be any type of network communications enabling dialogue management device 118 to communicate externally via local network 125 and/or network 105. In one example, network interface 210 may allow dialogue management device 118 to communicate locally with one or more components of organization computing system 106. In one example, network interface 210 may allow dialogue management device 118 to communicate externally with client device 102.

Storage 208 may be, for example, a disk storage device. Although shown as a single unit, storage 208 may be a combination of fixed and/or removable storage devices, such as fixed disk drives, removable memory cards, optical storage, network attached storage (NAS), storage area network (SAN), and the like.

Memory 206 may be representative of any suitable memory device such as volatile or non-volatile memory, random access memory (RAM), read only memory (ROM), and the like. Memory 206 may include instructions that enable processor 204 to execute one or more applications, such as server applications, network communication processes, and the like. Memory 206 may include programming instructions 214, operating system 216, event queue 218, and command queue 220.

Event queue 218 may be configured to temporarily store queued events. Command queue 220 may be configured to temporarily store queued commands. Processor 204 may receive events from event queue 218, and in response to processing the event, generate one or more commands to be output to command queue 220. In some embodiments, dialogue management device 118 may place commands in command queue 220 in an order they are generated. Each command may be designated to be executed by one or more devices, such as, for example, web server 108, call center server 110, transaction server 112, API server 114, planning device 115, and/or NLP device 116. Each such device may continuously or intermittently monitor command queue 220 to detect one or more commands that are designated to be executed by the monitoring device, and may access pertinent commands. Event queue 218 may receive one or more events from other devices, such as, for example, client device 102, web server 108, call center server 110, transaction server 112, API server 114, planning device 115, and/or NLP device 116.

While dialogue management device 118 has been described as one form for implementing one or more techniques described herein, those having ordinary skill in the art will appreciate that other, functionally equivalent techniques may be employed.

Figure 3:
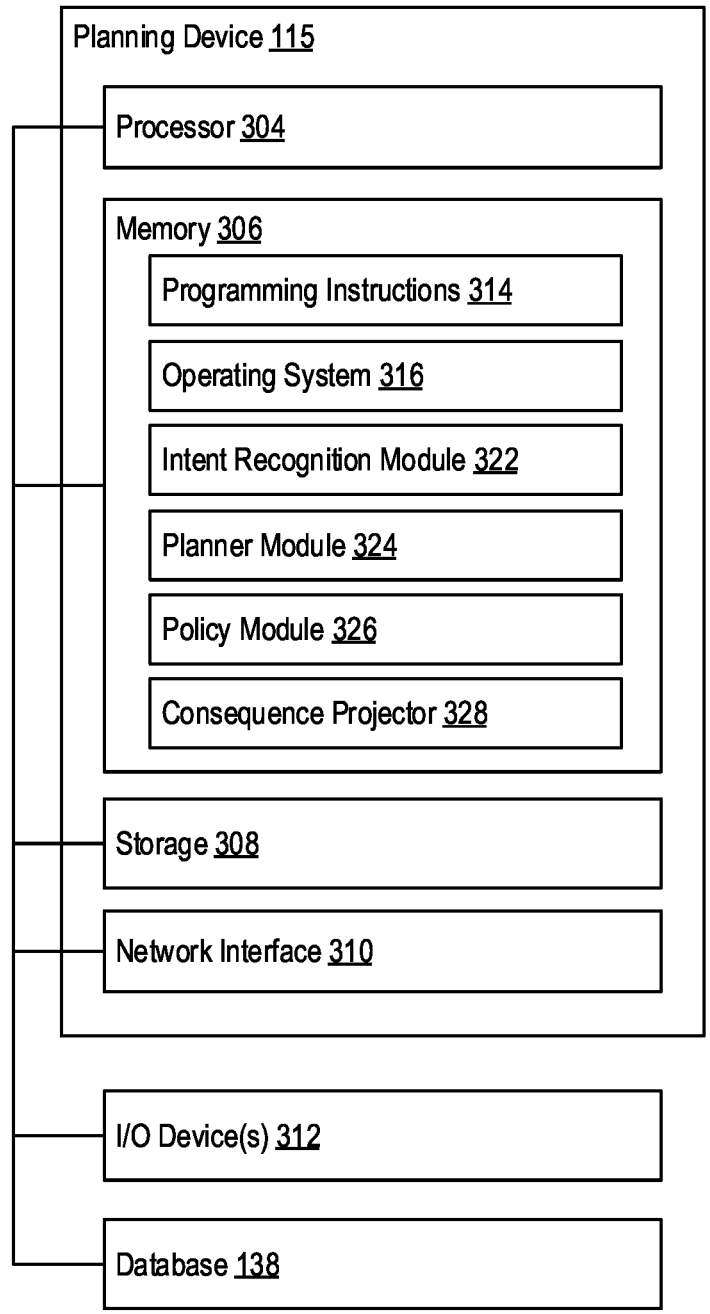
FIG. 3 is a block diagram illustrating a component of the computing environment of FIG. 1, according to one embodiment.

FIG. 3 is a block diagram illustrating planning device 115, according to one embodiment. Planning device 115 may include a processor 304, a memory 306, a storage 308, and a network interface 310. In some embodiments, planning device 115 may be coupled to one or more I/O device(s) 312.

In some embodiments, planning device 115 may be in communication with database 138. Database 138 may store information to enable planning device 115 to perform one or more of the processes and functionalities associated with the disclosed embodiments. Database 138 may include stored data relating to a customer profile and customer accounts, such as, for example, customer identification information (e.g., name, age, sex, birthday, address, VIP status, key customer status, preferences, preferred language, vehicle(s) owned, greeting name, channel, talking points, bank accounts, mortgage loan accounts, car loan accounts, account numbers, authorized users associated with one or more accounts, account balances, account payment information, and any other information that may be related to a user's account). Database 138 may store customer interaction data that includes records of previous customer service interactions with a customer via a website, SMS message, a chat program, a mobile application, an IVR system, or notations taken after speaking with a customer service agent. Database 138 may also include one or more previous plans generated by planning device 115. For example, database 138 may store one or more previous plans to ensure that a newly generated plan does not violate any of the previously established plans.

Processor 304 may include one or more of a microprocessor, microcontroller, digital processor, co-processor, or the like, or combinations thereof executing stored instructions and operating upon stored data. Processor 304 is included to be representative of a single processor, multiple processors, a single processor having multiple processing cores, and the like.

Network interface 310 may be any type of network communications enabling planning device 115 to communicate externally via local network 125 and/or network 105.

In one example, network interface 310 may allow planning device 115 to communicate locally with one or more components of organization computing system 106. In one example, network interface 310 may allow planning device 115 to communicate with dialogue management device 118.

Storage 308 may be, for example, a disk storage device. Although shown as a single unit, storage 308 may be a combination of fixed and/or removable storage devices, such as fixed disk drives, removable memory cards, optical storage, network attached storage (NAS), storage area network (SAN), and the like.

Memory 306 may be representative of any suitable memory device such as volatile or non-volatile memory, random access memory (RAM), read only memory (ROM), and the like. Memory 306 may include instructions that enable processor 304 to execute one or more applications, such as server applications, network communication processes, and the like. Memory 306 may include programming instructions 314, operating system 316, intent recognition module 322, planner module 324, policy module 326, and consequence projector 328.

Programming instructions 314 may be accessed by processor 304 for processing (i.e., executing programming instructions). Programming instructions 314 may include, for example, executable instructions for communicating with dialogue management device 118. For example, programming instructions 314 may include executable instructions configured to perform steps discussed below in conjunction with FIGS. 5, 7, and 8.

Each of intent recognition module 322, planner module 324, policy module 326, and consequence projector 328 may comprise one or more software modules. The one or more software modules are collections of instructions stored on a media (e.g., memory 306) that represent a series of machine instructions (e.g., program code) that implements one or more algorithmic steps. Such machine instructions may be the actual computer code processor 304 interprets to implement the instructions, or, alternatively, may be a higher level coding of the instructions that is interpreted to obtain the actual computer code. The one or more software modules may also include one or more hardware components. One or more aspects of the one or more algorithmic steps may be performed by the hardware components (e.g., circuitry) itself, rather than as a result of an instruction.

Intent recognition module 322 may be configured to understand the user's message transmitted to organization computing system 106. For example, user of client device 102 may transmit the following string of messages to organization computing system: "I know that I'm behind on my payment because I'm just getting outta the hospital can you pls give me til Sunday to pay on my acct." Using this example, intent recognition module 322 may identify one or more intents contained in the message and categorize the intents as one or more of a sentiment, an express goal, an implied goal, or a unresponsive narrative.

Planning device 115 may be trained via a machine learning module to identify and isolate the intents contained in an message. For example, continuing with the above example, intent recognition module 322 may determine that the goal of the user's message is to request an extension to make an account payment. In some embodiments, intent recognition module 322 may signal to processor 304 that more information is needed from the user to clarify (or disambiguate) a goal contained in the user's message. Continuing with the above example, intent recognition module 322 may determine that account payment is too obscure because the user has multiple accounts with the organization. As such, intent recognition module 322 may generate a notification to be transmitted to client device 102 of the user requesting further information.

Intent recognition module 322 may be further configured to determine a sentiment of the user based on the received message. In some embodiments, intent recognition module 322 may determine the sentiment of the user based on the identified intents. For example, intent recognition module 322 may analyze the received message and identify one or more words or phrases that may signal a current sentiment of the user. In some embodiments, intent recognition module 322 may determine a sentiment of the user based on a tone or inflection of the user's voice (e.g., those situations in which the user calls an automated phone channel). Intent recognition module 322 may be trained via one or more machine learning models to identify a current sentiment of the user both in messages received in both a textual format and an audible format. Continuing with the above example, intent recognition module 322 may determine that the user is currently experiencing a hardship (e.g., hospital visit/ hospital stay). As such, intent recognition module 322 may determine that the user is sad, somber, emotional, and the like.

Planner module 324 may be configured to generate a plan based on the received message. Planner module 324 may generate a response plan based on one or more identified goals and an identified sentiment of the user. For example, planner module 324 may be trained using one or more machine learning models to determine how certain identified goals and sentiments may tread towards a particular plan. The plan may include one or more action items to be executed by organization computing system 106. Each action item may correspond to a specific step in the generated plan. Continuing with the above example, planner module 324 may generate a plan of: (1) confirming with the user that the user can have until Sunday to make the account payment; (2) asking the user if the user would like to schedule an account payment for that Sunday; (3) if the user wishes to schedule an account payment for that Sunday, scheduling the account payment; and (4) on Sunday, making the account payment. Each of items (1)-(4) in the generated plan may be considered an action item.

Policy module 326 may be configured to cross-reference the generated plan against one or more policies of organization computing system 106. Policy module 326 may cross-reference the generated plan against one or more policies to determine whether any action items in the plan violate any pre-existing policies of the organization. For example, the above plan involves forgiving any penalty associated with a late payment. To determine whether the user may receive an extension, in some embodiments, policy module 326 may determine a number of times the user had previously been granted penalty forgiveness.

Consequence projector 328 may be configured to determine whether execution of the plan violates any pre-existing plans of the user. For example, planning device 115 may generate one or more plans for each user that may be stored in a database (e.g., database 138) and associated with the user's account. Consequence projector 328 may cross-reference the generated plan against one or more pre-existing plans or account information stored in database 138 to ensure that execution of the plan does not violate any of the pre-existing plans or account information. Using a new example, assume that a user submitted a request, and intent recognition module 322 determines that the user wishes to, make an account payment on the first of the month. Consequence projector 328 may determine, however, that the amount to be paid on the first of the month may violate a pre-existing plan for the user to make a mortgage payment on the first of the month, as well. This may be attributed to consequence projector 328 determining that such simultaneous payment (account and mortgage) would overdraw the user's bank account. In this scenario, consequence projector 328 may communicate with planner module 324, requesting that the generated plan be adjusted, for example, to pay the account on the third week of the month, by which time consequence projector 328 may predict (based off user transaction history) that the user will have sufficient funds to cover the account payment.

Figure 4:
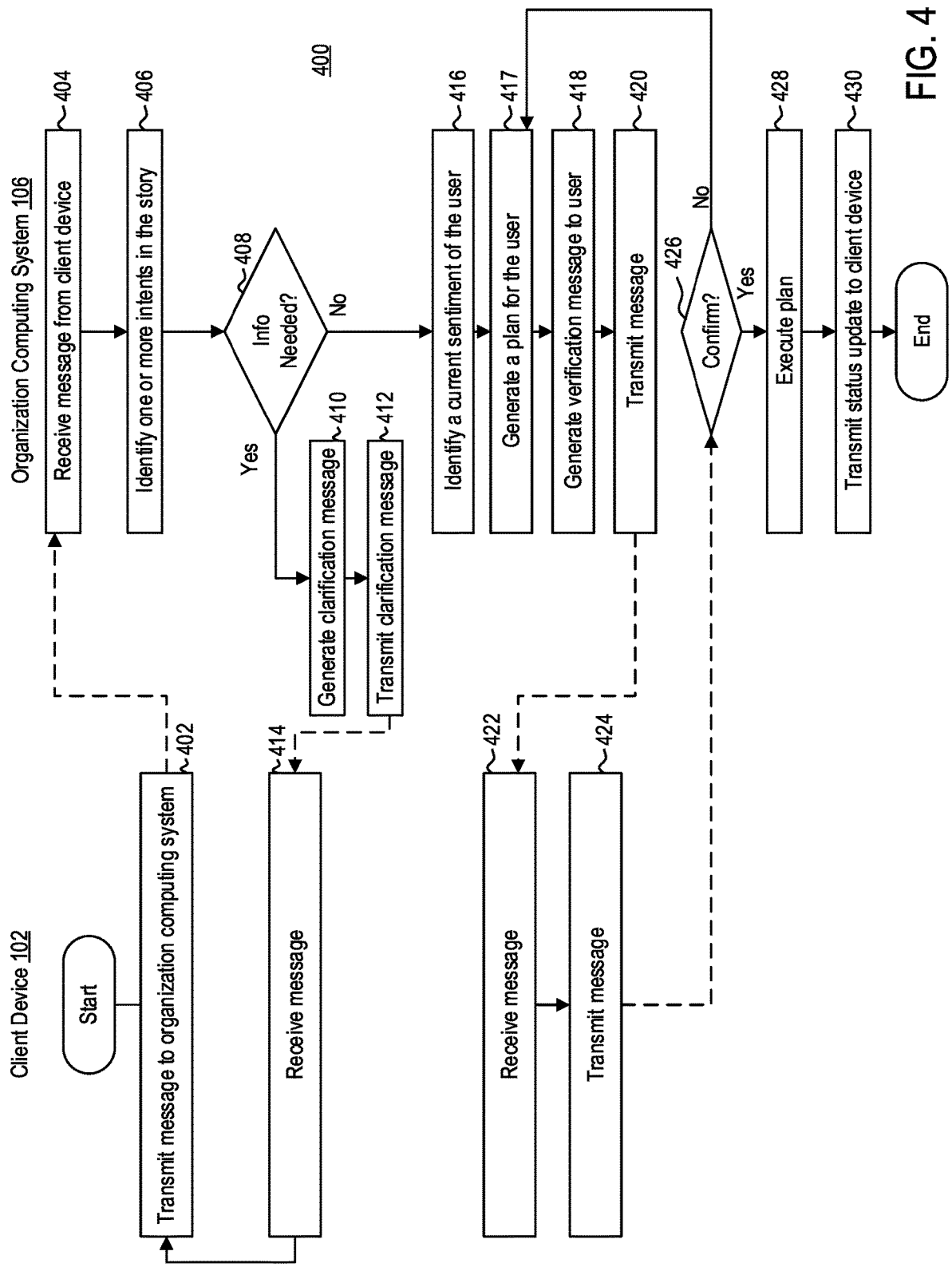
FIG. 4 is a flow diagram illustrating a method of translating natural language dialogue to executable action items, according to one embodiment.

FIG. 4 is flow diagram illustrating a method 400 of translating natural language dialogue to executable action items, according to one embodiment. Method 400 begins at step 402. At step 402, a user may transmit a message to organization computing system 106. In some embodiments, user may transmit the message to organization computing system 106 via client device 102. For example, user may transmit the message via text message (e.g., SMS client 122). In another example, user may transmit the message via application 120 while user interacts with an automated chatbot. In another example, user may transmit the message via application 120 while sending an email to organization computing system 106. In some embodiments, user may transmit the message to organization computing system 106 via VoIP client 124. In some embodiments, the message may be part of a pre-established dialogue with organization computing system 106. For example, user may have previously sent one or more message to organization computing system 106, prior to the received message at step 402. As such, throughout the dialogue with organization computing system 106, organization computing system 106 may continually build and update a customer context based on at least the one or more messages from the user.

At step 404, organization computing system 106 may receive the message from client device 102. Organization computing system 106 may receive the message via a communication interface (discussed further below in conjunction with FIGS. 5-8).

At step 406, organization computing system 106 may identify one or more intents contained in the received message. Intent recognition module 322 may categorize each identified intent as one or more of a sentiment, an express goal, an implied goal, or a unresponsive narrative. Intent recognition module 322 may be further configured to determine a sentiment of the user based on the received message. In some embodiments, intent recognition module 322 may determine the sentiment of the user based on the received message. For example, intent recognition module 322 may analyze the received message and identify one or more words or phrases that may signal a current sentiment of the user. In some embodiments, intent recognition module 322 may determine a sentiment of the user based on a tone or inflection of the user's voice (e.g., those situations in which the user calls an automated phone channel). Intent recognition module 322 may be trained via one or more machine learning models to identify a current sentiment of the user both in messages received in both a textual format and an audible format. At step 408, organization computing system 106 may determine whether more information is needed from the user. For example, organization computing system 106 may determine that more information is needed to clarify the user's goal. Aspects of step 408 may be performed, for example, by planning device 115. For example, planning module 324, during the process of generating a plan to address the identified one or more goals, may determine that more information is needed to clarify a particular goal.

If, at step 408, organization computing system 106 determines that more information is needed from the user, then method 400 proceeds to step 410. At step 410, organization computing system 106 may generate a clarification message. For example, organization computing system 106 may generate a clarification message to prompt the user to submit additional information to clarify an ambiguity in the request.

At step 412, organization computing system 106 may transmit the clarification message to the user. In some embodiments, organization computing system 106 may transmit the clarification message to the user via the same communication channel that organization computing system 106 received the initial message from the user. In some embodiments, organization computing system 106 may transmit the clarification message to the user via a communication channel different from that in which organization computing system 106 received the initial message from the user. For example, organization computing system 106 may transmit the clarification message via a text message based communication channel whereas the initial message was received via an email based communication channel.

At step 414, client device 102 may receive the clarification message from organization computing system 106. Step 414 may revert to step 402, in which client device 102 may transmit a message to organization computing system.

If, however, at step 408, organization computing system 106 determines that no further information is needed from the user of client device 102, then method 400 proceeds to step 416. At step 416, organization computing system 106 may identify a current sentiment of the user based on the received one or more messages (e.g., initial message and one or more clarifying messages). Aspects of step 406 may be performed, for example, by planning device 115. For example, intent recognition module 322 may analyze the identified intents, and identify one or more words or phrases that may signal a current sentiment of the user.

At step 417, organization computing system 106 may generate a plan based on identified intents in the user's message. The plan may include one or more executable action items contained therein. The one or more action items may correspond to one or more steps to be performed to carry out the user's request. Aspects of step 406 may be performed, for example, by planning device 115. For example, planning module 324, may generate the plan based on the identified intents.

At step 418, organization computing system 106 may generate a verification message to be transmitted to the user. Verification message may include a summary of the plan generated by organization computing system 106. Verification message allows a user to verify the plan prior to organization computing system 106 executing the plan. At step 420, organization computing system 106 may transmit the verification message to client device 102 of the user.

At step 422, client device 102 may receive the verification message from organization computing system 106. At step 424, client device 102 may transmit a further message to organization computing system 106. The further message may include a confirmation of the plan or a rejection of the plan.

At step 426, organization computing system 106 may receive the further message and determine whether the user confirmed the plan. If, at step 426, organization computing system 106 determines that the user confirmed the plan, then at step 428, organization computing system 106 may update an event queue with instructions to execute the one or more action items according to the plan. If, however, at step 426, organization computing system 106 determines that the user has rejected the plan, then method 400 reverts to step 416, and organization computing system 106 may generate a new plan.

At step 430, organization computing system 106 may transmit a status of execution of the plan to the user. For example, organization computing system 106 may keep the user up-to-date on the current actions being performed by organization computing system 106 to carry out the plan proposed to the user.

Figure 5:
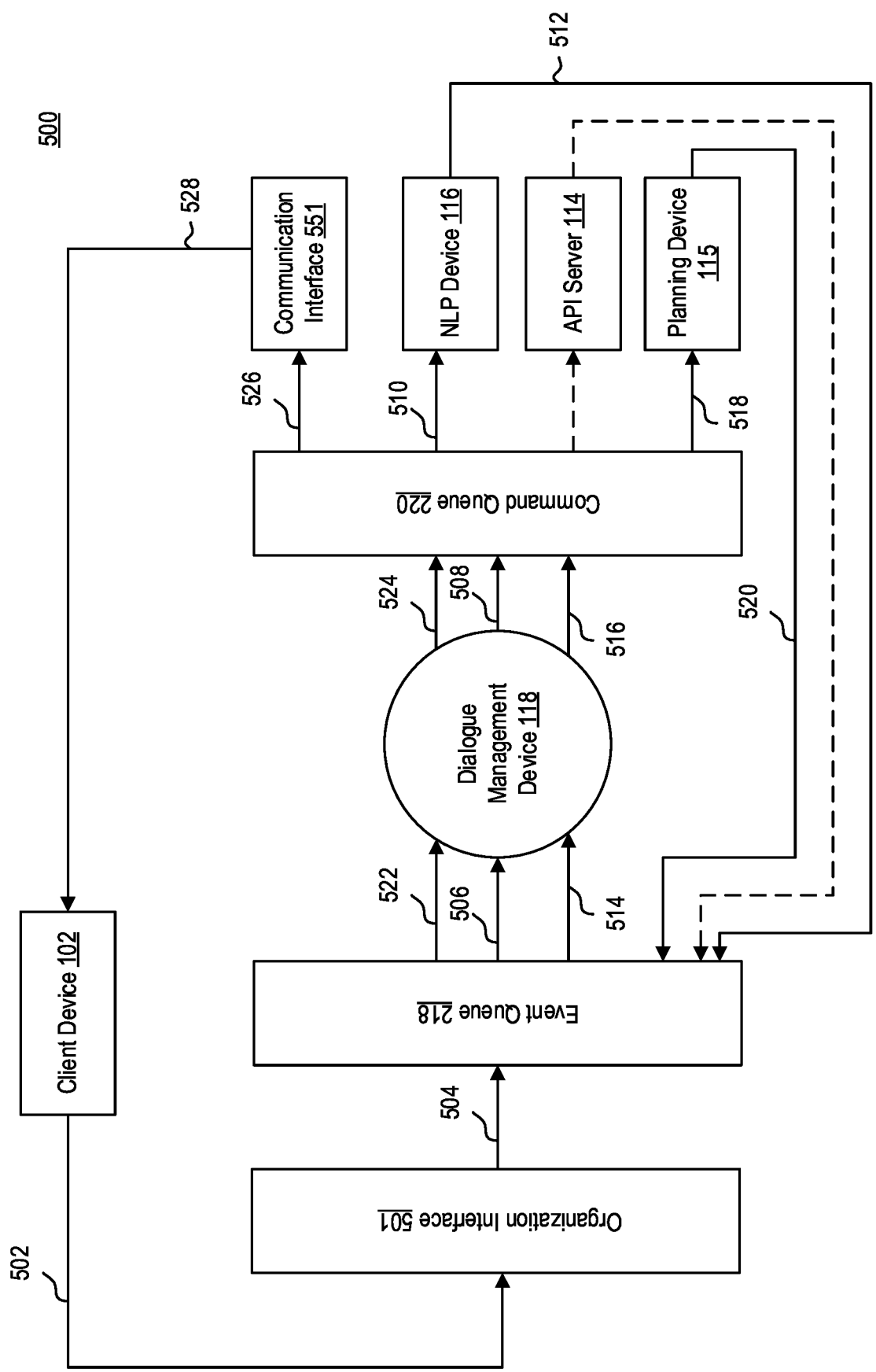
FIG. 5 is a block diagram illustrating interaction of one or more components of a computing environment, according to one embodiment.
Figure 7:
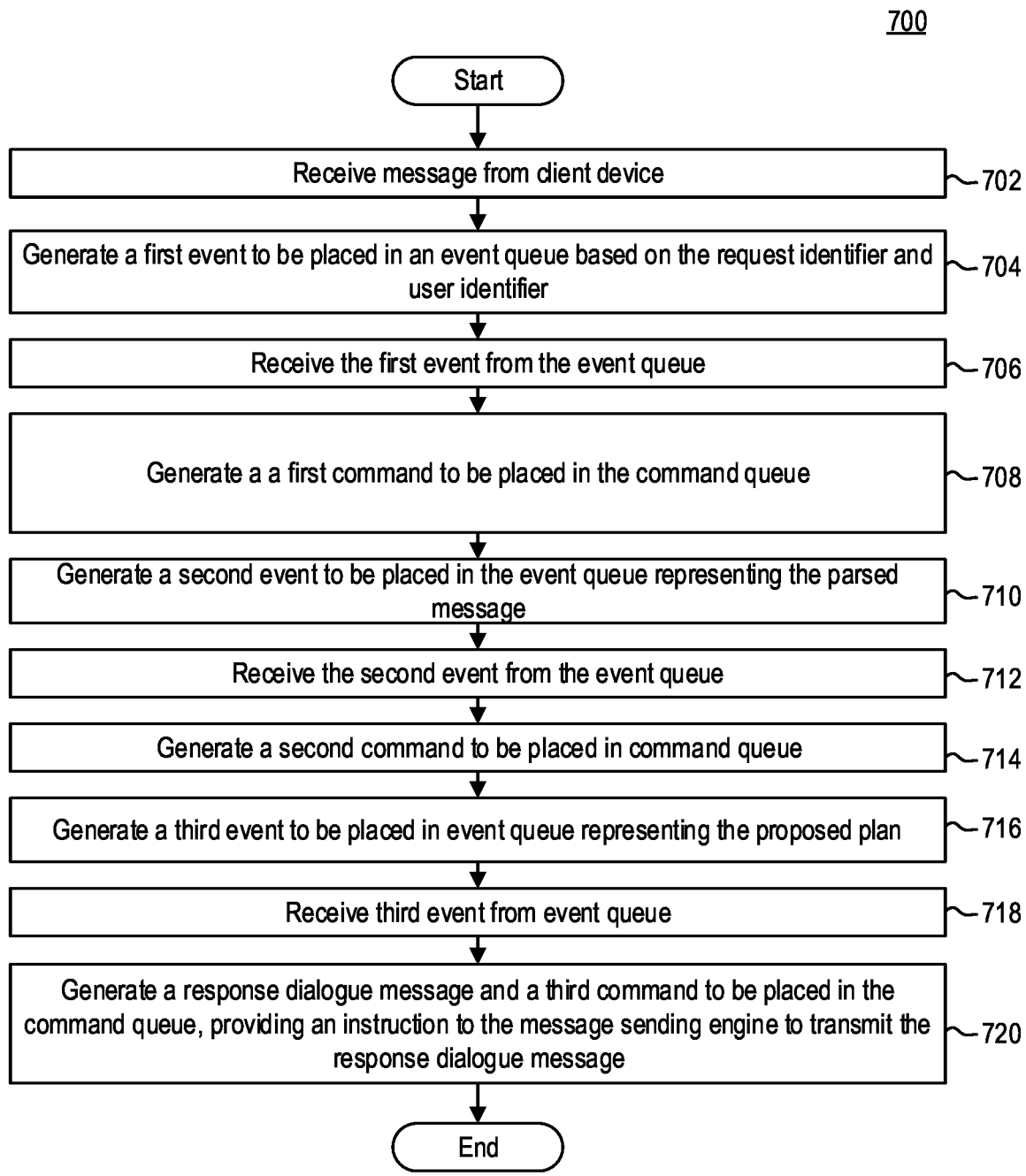
FIG. 7 is a flow diagram illustrating a method of translating natural language dialogue to executable action items, according to one embodiment.

FIG. 5 is a block diagram illustrating an exemplary system functionality diagram 500 for translating natural language dialogue to executable action items, according to some embodiments. The functionality described with respect to FIG. 5 may be executed by one or more components of computing system 100, as shown. FIG. 7 is a flow diagram illustrating a method 700 for translating natural language dialogue to executable action items, according to one embodiment. The one or more steps discussed in conjunction with FIG. 7 may correspond to the system functionality diagram 500 illustrated in FIG. 5.

As illustrated in FIG. 5, organization interface 501 may receive a dialogue message from client device 102 of a user at arrow 502 (e.g., step 702 of FIG. 7). Organization interface 501 may represent one or more of web server 108 or call center server 110, based on a communication channel via which the message is received. For example, if dialogue message from client device 102 is a text message or an email, organization interface 501 may represent web server 108. In another example, if dialogue message from client device 102 is an audible message via an artificial intelligence customer service channel, organization interface 501 may represent call center server 110.

As shown in FIGS. 5 and 7, at arrow 504 and step 704, organization computing system 106 may generate a first event to be placed in event queue 218. For example, organization interface 501 may generate a first event based on the received dialogue message from client device 102. The first event may include at least the dialogue message received from client device 102 and a user identifier associated with user of client device 102. As illustrated above in conjunction with FIG. 2, event queue 218 and command queue 220 may be one or more components of dialogue management device 118. In some embodiments, both event queue 218 and command queue 220 may be one or more components of a device other than dialogue management device 118. For example, those skilled in the art will appreciate that event queue 218 and command queue 220 may be one or more components maintained on a cloud server, accessible by, for example, dialogue management device 118.

In some embodiments, dialogue management device 118 may continuously (or intermittently) monitor event queue 218 for events posted therein. At arrow 506 (FIG. 5) and step 706 (FIG. 7), in response to detecting an event (e.g., the first event) in event queue 218, dialogue management device 118 may receive the event from event queue 218. In some embodiments, the user context may be derived using the user identifier included in the first event. For example, dialogue management device 118 may associate the user identifier with a given user and their user information that is stored in database 150. In some embodiments, the user information may include one or more of account types, account statuses, transaction history, conversation history, people models, an estimate of user sentiment, user goals, user social media information, and the like. The user context may allow organization computing system 106 to adapt and tailor its responses to a particular customer based on the identified user context. In some embodiments, the user context may be updated each time dialogue management device 118 receives a new event from event queue 218.

At arrow 508 (FIG. 5) and step 708 (FIG. 7), dialogue management device 118 may generate a first command to be placed in command queue 220. In some embodiments, dialogue management device 118 may generate a command based on the processed event and the customer context. In some embodiments, upon generating a command, dialogue management device 118 may identify a component that may subsequently execute the command. For example, dialogue management device 118 may determine whether one or more of API server 114, planning device 115, NLP device 116, or communication interface 551 may subsequently execute the command.

At arrows 510 and 512 (FIG. 5) and step 710 (FIG. 7), NLP device 116 may receive the first command from command queue 220. According to some embodiments, NLP device 116 may continuously or intermittently monitor command queue 220 to detect new commands and, upon detecting a new command, may receive the command from command queue 220. Upon receiving a command, NLP device 116 may perform various functions, depending on the nature of the command. For example, in some embodiments, NLP device 116 may determine the meaning of an incoming dialogue message by utilizing one or more artificial intelligence techniques. Such artificial intelligence techniques may include, but are not limited to, intent classification, named entity recognition, sentiment analysis, relation extraction, semantic role labeling, question analysis, rules extraction and discovery, and intent recognition.

In some embodiments, NLP device 116 may perform natural language generation in response to receiving a command. In some embodiments, NLP device 116 may perform natural language processing by utilizing one or more artificial intelligence techniques. Such artificial intelligence techniques may include, but are not limited to, content determination, discourse structuring, referring expression generation, lexicalization, linguistic realization, explanation generation. In the exemplary embodiment discussed in conjunction with FIGS. 5 and 7, NLP device 116 may determine the meaning of the incoming customer dialogue message and convert it to a form that may be processed by dialogue management device 118. Accordingly, NLP device 116 may generate a second event that represents a determined meaning of the incoming customer dialogue message. NLP device 116 may transmit the second event to event queue 218 (512 of FIG. 5).

At arrow 514 (FIG. 5) and step 712 (FIG. 7), dialogue management device 118 may receive the second event from event queue 218 in response to detecting the second event placed therein. At arrow 516 (FIG. 5) and step 714 (FIG. 7), dialogue management device 118 may, in response to processing the second event, generate a second command to be placed in command queue 220. In some embodiments, dialogue management device 118 may generate the second command based on the processed second event and the user context.

At arrows 518 and 520 (FIG. 5) and step 716 (FIG. 7), planning device 115 may receive the second command from command queue 220, execute the second command, and generate a third event to be placed in event queue 218. In some embodiments, planning device 115 may continuously or intermittently monitor command queue 220 to detect new commands. Upon receiving a command, planning device

115 may perform one or more functions associated with the command. For example, planning device 115 may identify one or more intents contained in the received dialogue message.

In some embodiments, planning device 115 may further identify a sentiment of the user based on the received dialogue message. Based on the received message, planning device 115 may generate a proposed plan. The proposed plan may include one or more action items that, when executed, achieve the one or more goals set forth in the user's dialogue message. Accordingly, in some embodiments, the third event (e.g., arrow 520) may represent a confirmation message to be transmitted to user of client device 102. The confirmation message may include a description of the proposed plan generated by planning device 115. In some embodiments, the confirmation message may further include an empathetic response reflecting the identified sentiment of the user. Accordingly, planning device 115 may generate a third event that represents the proposed plan and confirmation message. Planning device 115 may transmit the second event to event queue 218 (520 of FIG. 5).

At arrow 522 (FIG. 5) and step 718 (FIG. 7), dialogue management device 118 may receive the third event from event queue 218 in response to detecting the third event placed therein. At arrow 524 (FIG. 5) and step 720 (FIG. 7), dialogue management device 118 may, in response to processing the third event, generate a third command to be placed in command queue 220. In some embodiments, dialogue management device 118 may generate the third command based on the processed third event and the user context.

At arrows 526 and 528, communication interface 551 may receive and execute the third command, which may cause communication interface 551 to transmit the confirmation message to client device 102 from organization computing system 106. For example, executing the third command may cause communication interface to transmit (e.g., via text message) a response dialogue to client device 102 that provides a summary of the proposed plan, and a request to confirm the proposed plan. In some embodiments, the confirmation message may further include the empathetic response. For example, dialogue management device 118 may inject into confirmation message an empathetic response that matches the sentiment identified by planning device 115.

In some embodiments, communication interface 551 may continuously or intermittently monitor command queue 220 for new commands, and may receive the third command in response to detecting the third command posted to event queue 218. In some embodiments, communication interface 551 may be a standalone component having some or all elements of dialogue management device 118, as illustrated in FIG. 2. In some embodiments, communication interface 551 may be integrated into dialogue management device 118 (e.g., as an I/O device 212). In some embodiments, communication interface 551 may be integrated into another component of organization computing system 106, such as, for example, web server 108, call center server 110, transaction server 112, API server 114, planning device 115, or NLP device 116.

Figure 6:
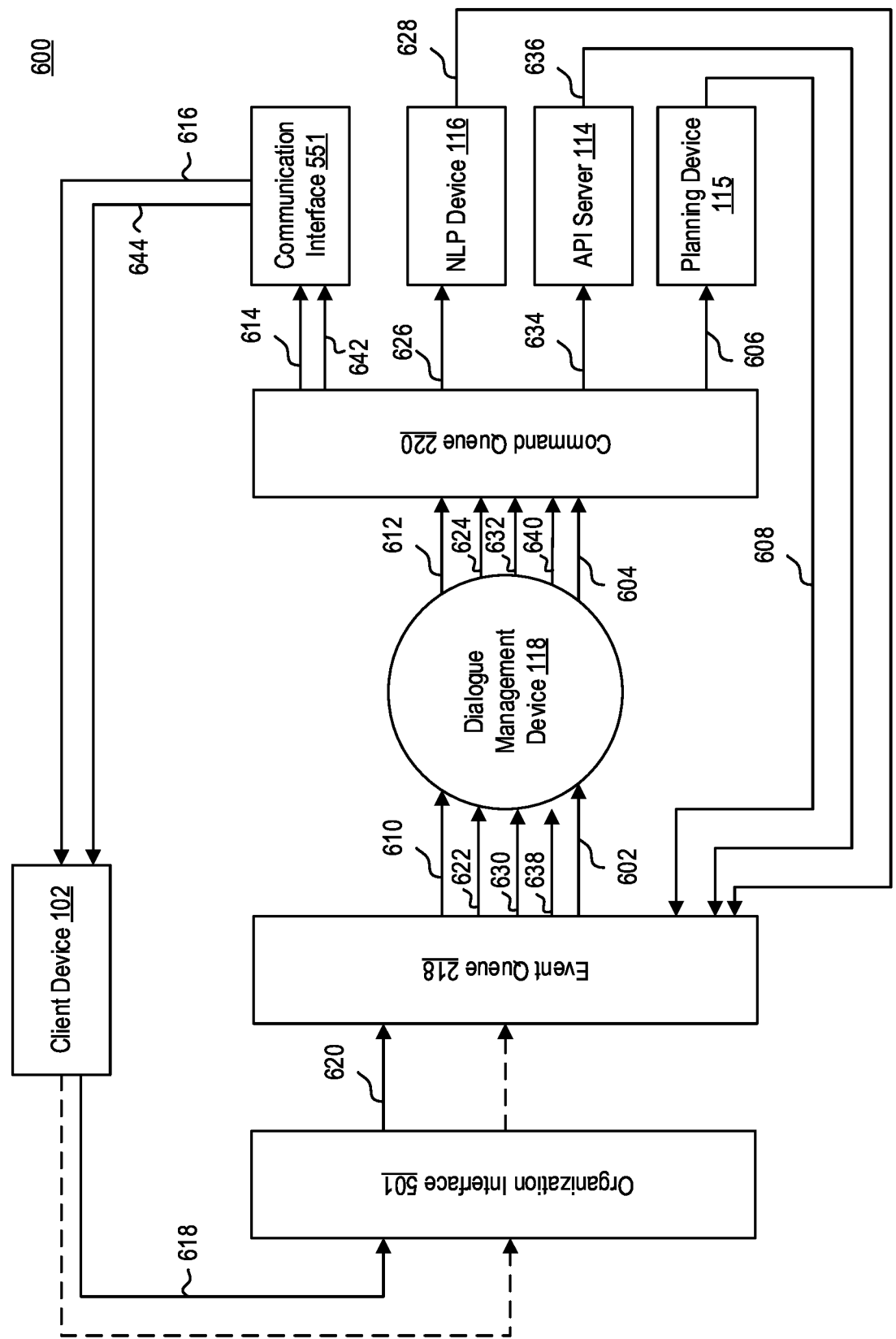
FIG. 6 is a block diagram illustrating interaction of one or more components of a computing environment, according to one embodiment.
Figure 8:
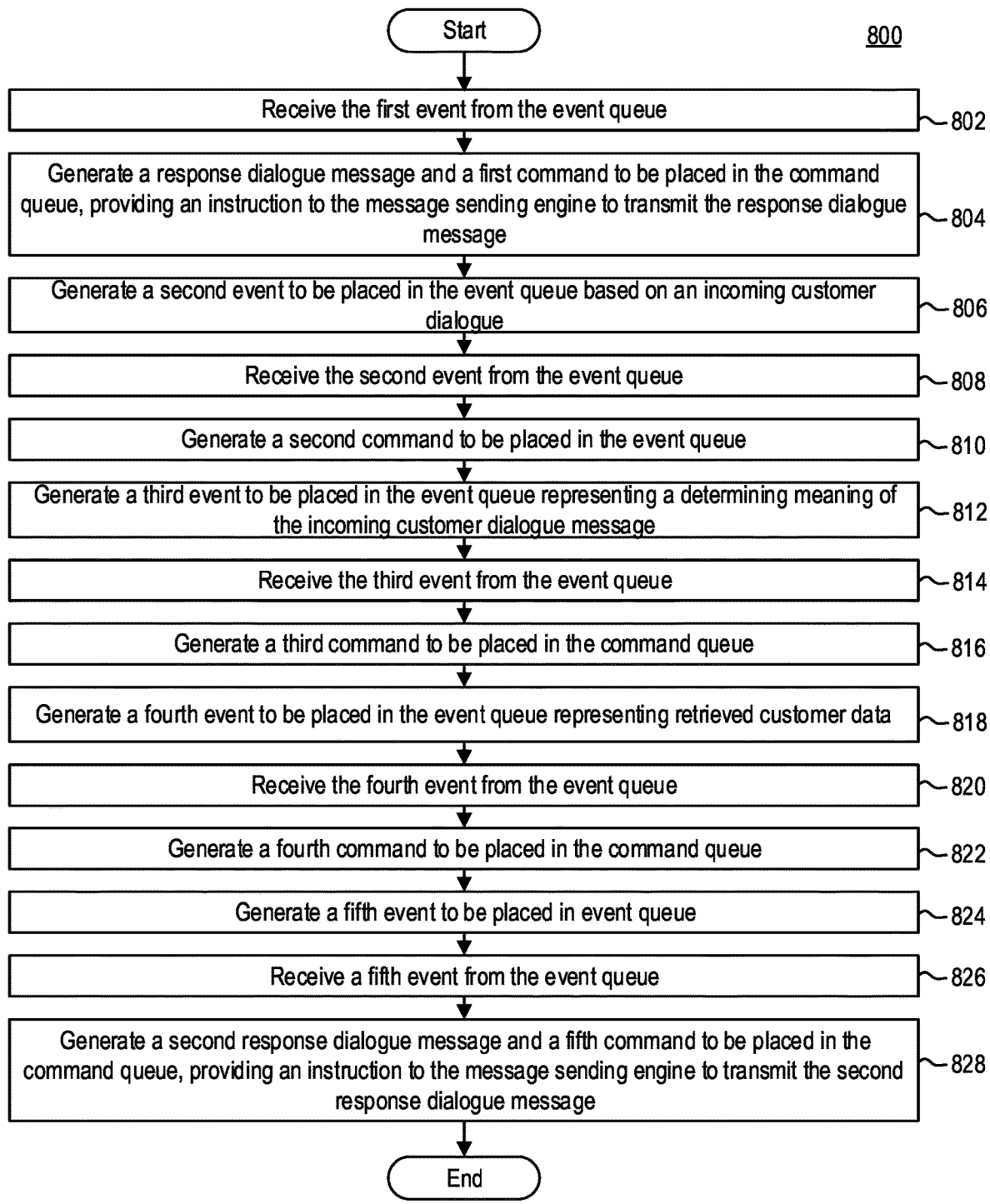
FIG. 8 is a flow diagram illustrating a method of translating natural language dialogue to executable action items, according to one embodiment.

FIG. 6 is a block diagram illustrating an exemplary system functionality diagram 600 for translating natural language dialogue to executable action items, according to one embodiment. The functionality illustrated in FIG. 6 may be executed by one or more components of computing system 100. FIG. 8 is a flow diagram illustrating a method 800 for translating natural language dialogue to executable action items, according to one embodiment. The one or more steps discussed in conjunction with FIG. 8 may correspond to the system functionality diagram 600 illustrated in FIG. 6.

For ease of discussion, similar to FIGS. 5 and 7, organization interface 501 may have received an incoming dialogue message from client device 102, which was parsed by NLP device 116. FIG. 6 may begin at arrow 602 following the processing by NLP device 116.

At arrow 602 (FIG. 6) and block 802 (FIG. 8), in response to detecting an event (e.g., the first event) in event queue 218, dialogue management device 118 may receive the event from event queue 218. In some embodiments, the user context may be derived using the user identifier included in the first event. For example, dialogue management device 118 may associate the user identifier with a given user and their user information that is stored in database 150. In some embodiments, the user information may include one or more of account types, account statuses, transaction history, conversation history, people models, an estimate of user sentiment, user goals, user social media information, and the like. The user context may allow organization computing system 106 to adapt and tailor its responses to a particular customer based on the identified user context. In some embodiments, the user context may be updated each time dialogue management device 118 receives a new event from event queue 218.

At arrow 604 (FIG. 6) and block 804 (FIG. 8), dialogue management device 118 may generate a first command to be placed in command queue 220. In some embodiments, dialogue management device 118 may generate a command based on the processed event and the customer context. In some embodiments, upon generating a command, dialogue management device 118 may identify a component that may subsequently execute the command. For example, dialogue management device 118 may determine whether one or more of API server 114, planning device 115, NLP device 116, or communication interface 551 may subsequently execute the command.

At arrows 606 and 608 (FIG. 6) and step 806 (FIG. 8), planning device 115 may receive the first command from command queue 220, execute the first command, and generate a second event to be placed in event queue 218. In some embodiments, planning device 115 may continuously or intermittently monitor command queue 220 to detect new commands. Upon receiving a command, planning device 115 may perform one or more functions associated with the command. For example, planning device 115 may identify one or more intents contained therein. In some embodiments, planning device 115 may further identify a sentiment of the user based on the received dialogue message. Based on the received message, planning device 115 may generate a proposed plan. The proposed plan may include one or more action items that, when executed, achieve the one or more goals set forth in the user's dialogue message.

In this embodiment, planning device 115 may determine that further information is needed to carry out one or more goals contained therein. For example, in response to receiving the message—"I'm sorry for being late on my payment, I just got out of the hospital. Can I pls get an extension until Sunday?"—planning device 115 may determine that the user would like to request an extension on paying his or her account, but the user has multiple accounts with the organization with outstanding payments. Accordingly, the second event may represent a clarification message, asking the user to clarify the request. In some embodiments, the clarification message may further include an empathetic response reflecting the identified sentiment of the user.

Accordingly, planning device 115 may generate a second event that represents the clarification message. Planning device 115 may transmit the second event to event queue 218 (608 of FIG. 6).

At arrow 610 (FIG. 6) and step 808 (FIG. 8), dialogue management device 118 may receive the second event from event queue 218 in response to detecting the second event placed therein. At arrow 612 (FIG. 6) and block 810 (FIG. 8), dialogue management device 118 may, in response to processing the second event, generate a second command to be placed in command queue 220. In some embodiments, dialogue management device 118 may generate the second command based on the processed second event and the user context.

At arrows 614 and 616, communication interface 551 may receive and execute the second command, which may cause communication interface 551 to transmit the clarification message to client device 102 from organization computing system 106. For example, executing the second command may cause communication interface to transmit (e.g., via text message) a response dialogue to client device 102 that seeks clarification to a message received from the user. In some embodiments, the clarification message may further include an empathetic response. For example, dialogue management device 118 may inject into clarification message an empathetic response that matches the sentiment identified by planning device 115.

In some embodiments, communication interface 551 may continuously or intermittently monitor command queue 220 for new commands, and may receive the second command in response to detecting the second command posted to event queue 220. In some embodiments, communication interface 551 may be a standalone component having some or all elements of dialogue management device 118, as illustrated in FIG. 2. In some embodiments, communication interface 551 may be integrated into dialogue management device 118 (e.g., as an I/O device 212). In some embodiments, communication interface 551 may be integrated into another component of organization computing system 106, such as, for example, web server 108, call center server 110, transaction server 112, API server 114, planning device 115, or NLP device 116.

At arrow 618, communication interface 501 may receive a second incoming dialogue message from client device 102. The second incoming dialogue message may be received in response to the user receiving and responding to the clarification message. In some embodiments, the incoming dialogue message from client device 102 may be transmitted via a same communication channel as the outgoing clarification message (arrow 616.) For example, if the clarification message is transmitted to client device 102 via text message, the second incoming dialogue message may be received from client device 102 via text message. In some embodiments, the second incoming dialogue message from client device 102 may be transmitted via a different communication channel. For example, if the clarification message is transmitted to client device 102 via email, the second incoming dialogue message may be received from client device 102 via text message.

At arrow 620 (FIG. 6) and step 812 (FIG. 8), organization computing system 106 may generate a third event to be placed in event queue 218 in response to receiving the second customer dialogue message. In some embodiments, the second customer dialogue message may be sent to organization interface 501, and subsequently transmitted to event queue 218. In some embodiments, the second customer dialogue message may be sent directly from client device 102 to event queue 218. In some embodiments, the second customer dialogue message may be transmitted to dialogue management device 118, and subsequently transmitted from dialogue management device 118 to command queue 220. The customer dialogue message may include information associated with the clarification message transmitted from communication interface 551 to client device 102.

In some embodiments, dialogue management device 118 may continuously or intermittently monitor event queue 218. At arrow 622 (FIG. 6) and step 814 (FIG. 8) in response to detecting an event (e.g., the third event) in event queue 218, the event may be received at dialogue management device 118. At arrow 624 (FIG. 6) and step 816 (FIG. 8), dialogue management device 118 may, in response to processing the third event, generate a third command to be placed in command queue 220. In some embodiments, dialogue management device 118 may generate the command based on the processed event, the message received from the client device 102, and customer context. In some embodiments, when dialogue management device 118 generates a command, such as the third command, dialogue management device 118 may determine an entity that will execute the command. For example, in the embodiment discussed in conjunction with FIGS. 6 and 8, dialogue management device 118 may determine that the third command is to be executed by NLP device 116 in order to determine the meaning of incoming customer dialogue message.

At arrow 626 (FIG. 6) and step 818 (FIG. 8), NLP device 116 may receive the third command from command queue 220. According to some embodiments, NLP device 116 may continuously or intermittently monitor command queue 220 to detect new commands and, upon detecting a new command, may receive the command from command queue 220. Upon receiving a command, NLP device 116 may perform various functions, depending on the nature of the command. For example, in some embodiments, NLP device 116 may determine the meaning of an incoming dialogue message by utilizing one or more artificial intelligence techniques. Such artificial intelligence techniques may include, but are not limited to, intent classification, named entity recognition, sentiment analysis, relation extraction, semantic role labeling, question analysis, rules extraction and discovery, and intent identification.

In some embodiments, NLP device 116 may perform natural language generation in response to receiving a command. In some embodiments, NLP device 116 may perform natural language processing by utilizing one or more artificial intelligence techniques. Such artificial intelligence techniques may include, but are not limited to, content determination, discourse structuring, referring expression generation, lexicalization, linguistic realization, explanation generation. In the exemplary embodiment discussed in conjunction with FIGS. 5B and 7, NLP device 116 may determine the meaning of the incoming customer dialogue message and convert it to a form that may be processed by dialogue management device 118. Accordingly, dialogue management device 118 may generate a fourth event that represents a determined meaning of the incoming customer dialogue message. NLP device 116 may transmit the fourth event to event queue 218 (628 of FIG. 6).

At arrow 630 (FIG. 6) and step 820 (FIG. 8), dialogue management device 118 may receive the fourth event from event queue 218, in response to detecting the fourth event, according to one or more operations described above. At arrow 632 (FIG. 6) and step 822 (FIG. 8), dialogue management device 118 may, in response to processing the fourth event, generate a fourth command to be placed in command queue 220. According to some embodiments, dialogue management device 118 may generate the fourth command based at least on the processed event and customer context.

At arrow 634 (FIG. 6) and step 824 (FIG. 8), API server 114 may receive the fourth command from command queue 220, execute the command, and generate a fifth event to be placed in event queue 218 (arrow 636 of FIG. 6). According to some embodiments, API server 114 may continuously or intermittently monitor command queue 220 to detect new commands. Upon detecting a new command in command queue 220, API server 114 may receive the command from command queue 220. Upon receiving a command, API server 114 may perform various functions, depending on the nature of the command. For example, in some embodiments, API server 114 may call up an API stored locally or remotely on another device, to retrieve customer information (e.g., retrieve an account balance), perform an account action (e.g., make an account payment), or execute an opt-in/opt-out command.

At arrow 638 (FIG. 6) and step 826 (FIG. 8), dialogue management device 118 may receive the fifth event from event queue 218 in response to detecting the fifth event, according to one or more operations discussed above. At arrow 640 (FIG. 6) and step 828 (FIG. 8), dialogue management device 118 may, in response to processing the fifth event, generate a fifth command to be placed in command queue 220. According to some embodiments, dialogue management device 118 may generate the fifth command based on at least the processed fifth event and the customer context. In some embodiments, dialogue management device 118 may also generate a response dialogue message in response to processing the fifth event. In some embodiments, dialogue management device 118 may receive a response dialogue message (e.g., confirmation of payment) as an event produced by NLP device 116. In some embodiments, the fifth command may represent a command or instructions to communication interface 551 to transmit the response dialogue message to client device 102.

At arrows 642 and 644, communication interface 551 may receive and execute the fifth command, which may cause communication interface 551 to transmit the confirmation message to client device 102 from organization computing system 106. For example, executing the fifth command may cause communication interface to transmit (e.g., via text message) a response dialogue message to client device 102 that provides a summary of the actions performed by organization computing system 106 (e.g., payment of an account). In some embodiments, the confirmation message may further include an empathetic response. For example, dialogue management device 118 may inject into confirmation message an empathetic response that matches the sentiment identified by planning device 115.

Although FIGS. 5-8 provided above are discussed in reference to a financial organization, those skilled in the art may readily understand that the application of the techniques discussed herein are not limited to a financial organization. Rather, the one or more techniques described herein may be applied to a variety of fields that includes, for example, medical, business, management, educational, and the like. As such, the presently disclosed system may be used in any scenario in which a user communicates with an electronic system in natural language.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A computer-implemented method of generating an actionable plan in response to natural language dialogue, comprising:
   identifying, by a computing system, a dialogue message originating from a user account;
   identifying, by the computing system using natural language processing, a user goal associated with the user account based on the dialogue message;
   generating, by the computing system, a plan comprising a sequence of actions to address the user goal using a machine learning model trained to identify the sequence of actions based on the dialogue message; and
   executing, by the computing system, at least one action of the sequence of actions according to the plan.

2. The computer-implemented method of claim 1, wherein identifying, by the computing system using the natural language processing, the user goal comprises:
   deconstructing the dialogue message into a plurality of components, the plurality of components indicating an intent of the dialogue message or context associated with the dialogue message.

3. The computer-implemented method of claim 2, further comprising:
   categorizing at least one component of the plurality of components as an implied goal based on the context of the dialogue message.

4. The computer-implemented method of claim 2, further comprising:
   categorizing at least one component of the plurality of components as an express goal based on the intent of the dialogue message or the context associated with the dialogue message.

5. The computer-implemented method of claim 1, further comprising:

identifying, by the computing system, a user sentiment in the dialogue message.

6. The computer-implemented method of claim 5, wherein generating, by the computing system, the plan comprising the sequence of actions to address the user goal comprises:
  tailoring the at least one action of the sequence of actions based on the user sentiment.

7. The computer-implemented method of claim 1, further comprising:
  prior to executing the at least one action, cross-referencing the plan against one or more policies associated with the user account to determine whether the plan violates a policy of the one or more policies.

8. A non-transitory computer readable medium comprising one or more sequences of instructions, which, when executed by one or more processors, causes a computing system to perform operations comprising:
  identifying, by the computing system, a dialogue message originating from a user account;
  identifying, by the computing system using natural language processing, a user goal associated with the user account based on the dialogue message;
  generating, by the computing system, a plan comprising at least one action to address the user goal using a machine learning model trained to identify the at least one action based on the dialogue message; and
  executing, by the computing system, the at least one action according to the plan.

9. The non-transitory computer readable medium of claim 8, wherein identifying, by the computing system using the natural language processing, the user goal comprises:
  deconstructing the dialogue message into a plurality of components, the plurality of components indicating an intent of the dialogue message or context associated with the dialogue message.

10. The non-transitory computer readable medium of claim 9, further comprising:
  categorizing at least one component of the plurality of components as an implied goal based on the context of the dialogue message.

11. The non-transitory computer readable medium of claim 9, further comprising:
  categorizing at least one component of the plurality of components as an express goal based on the intent of the dialogue message or the context associated with the dialogue message.

12. The non-transitory computer readable medium of claim 8, further comprising:
  identifying, by the computing system, a user sentiment in the dialogue message.

13. The non-transitory computer readable medium of claim 12, wherein generating, by the computing system, the plan comprising the at least one action to address the user goal comprises:
  tailoring the at least one action of the at least one action based on the user sentiment.

14. The non-transitory computer readable medium of claim 8, further comprising:
  prior to executing the at least one action, cross-referencing the plan against one or more policies associated with the user account to determine whether the plan violates a policy of the one or more policies.

15. A system, comprising:
  a processor; and
  a memory having programming instructions stored thereon, which, when executed by the processor, causes the system to perform operations comprising:
  identifying a dialogue message originating from a user account;
  identifying, using natural language processing, a user goal associated with the user account based on the dialogue message;
  generating a plan comprising a plurality of actions to address the user goal using a machine learning model trained to identify the plurality of actions based on the dialogue message; and
  executing at least one action of the plurality of actions according to the plan.

16. The system of claim 15, wherein identifying, using the natural language processing, the user goal comprises:
  deconstructing the dialogue message into a plurality of components, the plurality of components indicating an intent of the dialogue message or context associated with the dialogue message.

17. The system of claim 16, wherein the operations further comprise:
  categorizing at least one component of the plurality of components as an implied goal based on the context of the dialogue message.

18. The system of claim 16, wherein the operations further comprise:
  categorizing at least one component of the plurality of components as an express goal based on the intent of the dialogue message or the context associated with the dialogue message.

19. The system of claim 16, wherein the operations further comprise:
  identifying a user sentiment in the dialogue message.

20. The system of claim 19, wherein generating the plan comprising the plurality of actions to address the user goal comprises:
  tailoring the at least one action of the plurality of actions based on the user sentiment.

* * * * *